(12) United States Patent
Wu

(10) Patent No.: US 8,080,956 B2
(45) Date of Patent: Dec. 20, 2011

(54) ELECTRIC MOTOR TORQUE ESTIMATION

(75) Inventor: Ji Wu, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/869,399

(22) Filed: Aug. 26, 2010

(65) Prior Publication Data

US 2011/0140643 A1 Jun. 16, 2011

(51) Int. Cl.
*H02P 6/08* (2006.01)
(52) U.S. Cl. ......... 318/400.15; 318/400.02; 318/400.39; 318/432
(58) Field of Classification Search ............. 318/400.02, 318/400.14, 400.15, 432, 685, 722, 807, 318/727, 812, 400.39
See application file for complete search history.

(56) References Cited

U.S. PATENT DOCUMENTS

| | | | |
|---|---|---|---|
| 6,674,262 B2* | 1/2004 | Kitajima et al. | 318/722 |
| 6,741,060 B2* | 5/2004 | Krefta et al. | 318/727 |
| 6,850,033 B1* | 2/2005 | Gallegos-Lopez et al. | 318/807 |
| 7,017,377 B2* | 3/2006 | Hosoito et al. | 68/12.16 |
| 7,242,163 B2* | 7/2007 | Gallegos-Lopez et al. | 318/812 |
| 7,403,404 B2* | 7/2008 | Oka et al. | 363/40 |
| 7,586,286 B2* | 9/2009 | Cheng et al. | 318/807 |
| 7,733,051 B2* | 6/2010 | Tsui et al. | 318/685 |
| 2002/0097015 A1* | 7/2002 | Kitajima et al. | 318/432 |
| 2002/0145837 A1* | 10/2002 | Krefta et al. | 361/23 |
| 2006/0006825 A1 | 1/2006 | Inaguma et al. | |
| 2006/0215429 A1* | 9/2006 | Oka et al. | 363/97 |
| 2008/0116842 A1* | 5/2008 | Cheng et al. | 318/807 |
| 2009/0179602 A1* | 7/2009 | Hayashi et al. | 318/400.02 |
| 2009/0237014 A1* | 9/2009 | Yamada | 318/400.02 |
| 2010/0001671 A1* | 1/2010 | Yamada et al. | 318/400.14 |
| 2010/0109584 A1* | 5/2010 | Kwon et al. | 318/400.02 |

FOREIGN PATENT DOCUMENTS

| | | |
|---|---|---|
| EP | 1014554 A2 | 6/2000 |
| EP | 1401093 A2 | 3/2004 |
| WO | 2007066182 A1 | 6/2007 |

OTHER PUBLICATIONS

Mohamed et al., "Performance of modified direct torque controlled induction motor drives", Alexandria Engineering Journal, vol. 40, No. 1, Jan. 2001, pp. 45-54.

* cited by examiner

*Primary Examiner* — Paul Ip
(74) *Attorney, Agent, or Firm* — David B. Kelley; Brooks Kushman P.C.

(57) ABSTRACT

A method of controlling a vehicle including a permanent magnet (PM) synchronous motor is provided. The motor is calibrated such that for each torque command, there are corresponding direct-axis (d-axis) and quadrature axis (q-axis) current commands. The method includes establishing a torque command T*. D-axis and q-axis current commands Id* and Iq*, respectively, corresponding to the torque command T* are determined. The motor is controlled based on Id* and Iq*. D-axis and q-axis currents Id and Iq, respectively, are measured. An output torque is estimated as a sum of the torque command T* and a torque difference. The torque difference is determined as a function of Id*, Iq*, Id, and Iq. The vehicle may be controlled based on the estimated output torque.

16 Claims, 3 Drawing Sheets

ELECTRIC MOTOR TORQUE ESTIMATION

BACKGROUND

1. Technical Field

The invention relates to electric motor torque estimation. The invention further relates to hybrid and electric vehicles that use permanent magnet (PM) motors.

2. Background Art

The use of permanent magnet (PM) synchronous motors has become widespread. In general, a PM synchronous motor includes a rotor having permanent magnets mounted on the rotor periphery or buried inside the rotor.

In some applications of PM synchronous motors, it is desired to estimate the motor torque produced.

An existing torque estimation method is based on torque equation:

$$T = P/2 [phi \times Iq + (Ld-Lq) \times Id \times Iq],$$

in which P is number of poles, phi is permanent magnet flux linkage, Id and Iq are currents which are measured and converted to d and q axes of the motor, Ld and Lq are the inductance at d and q axes. Ld and Lq are also affected by Id and Iq because of the saturation effect of the magnetic circuit.

Normally, current can be easily measured accurately, and phi only varies linearly with temperature and thus can be adjusted easily.

Although this method may be appropriate in some applications, the problem of this method is that the accuracy of the estimation greatly depends on the estimations of Ld and Lq which are very difficult to obtain.

Background information may be found in U.S. Pub. Nos. 2006/0006825A1 and 2009/0179602A1; WO2007066182A1; EP1014554A2; U.S. Pat. No. 7,586,286; and EP1401093A2. Further background information may be found in Y. S. Mohamed and A. A. Hassan, "Performance of modified direct torque controlled induction motor drives," Alexandria Engineering Journal, Vol. 40, No. 1, January, 2001.

SUMMARY

It is an object of the invention to provide an improved electric motor torque estimation. In more detail, it is an object of the invention to provide improvements in torque estimation for electric machines by using current feedback and current command.

In one embodiment, a method of controlling a vehicle including a permanent magnet (PM) synchronous motor is provided. The motor is calibrated such that for each torque command, there are corresponding direct-axis (d-axis) and quadrature axis (q-axis) current commands. The method comprises establishing a torque command T*, and determining d-axis and q-axis current commands Id* and Iq*, respectively, corresponding to the torque command T*.

The method further comprises controlling the motor based on Id* and Iq*, and measuring d-axis and q-axis currents Id and Iq, respectively. An output torque is estimated as a sum of the torque command T* and a torque difference. The torque difference is determined as a function of Id*, Iq*, Id, and Iq. The vehicle may be controlled based on the estimated output torque.

At the more detailed level, the invention contemplates various additional features that may be included individually or in appropriate combinations in any embodiments of the invention. For example, the torque command T* may be based on vehicle operating conditions. The vehicle may include a memory, and controlling the vehicle based on the estimated output torque may include storing a diagnostic code in the memory (for example, when estimated output torque falls outside of a normal expected range of values).

In some embodiments, torque commands are mapped to corresponding direct-axis (d-axis) and quadrature axis (q-axis) current commands by establishing a look-up table.

In one embodiment, the method further comprises calculating d-axis and q-axis current errors Id_e and Iq_e, respectively, wherein Id_e=Id−Id*, and Iq_e=Iq−Iq*. In turn, the torque difference is determined in accordance with:

$$T\_diff = P/2 \times [Phi \times Iq\_e + (Ld-Lq) \times (Id\_e \times Iq^* + Iq\_e \times Id^* + Id\_e \times Iq\_e)],$$

wherein T_diff is the torque difference, P is number of poles, phi is permanent magnet flux linkage, Ld is inductance at the d-axis, and Lq is inductance at the q-axis.

It is appreciated that embodiments of the invention are particularly useful in hybrid and electric vehicles that use permanent magnet (PM) motors. In addition, embodiments of the invention may be implemented in other applications.

In an additional embodiment of the invention, a method of controlling a permanent magnet (PM) synchronous motor is provided. The motor is calibrated such that for each torque command, there are corresponding direct-axis (d-axis) and quadrature axis (q-axis) current commands. The method comprises establishing a torque command T*, and determining d-axis and q-axis current commands Id* and Iq*, respectively, corresponding to the torque command T*. The method further comprises controlling the motor based on Id* and Iq*, and measuring d-axis and q-axis currents Id and Iq, respectively. An output torque is estimated as a sum of the torque command T* and a torque difference. The torque difference is determined as a function of Id*, Iq*, Id, and Iq. An output signal indicative of the estimated output torque may be generated.

In yet another embodiment of the invention, an apparatus for controlling a permanent magnet (PM) synchronous motor is provided. The apparatus comprises a motor controller configured to: control the motor based on d-axis and q-axis current commands Id* and Iq*, respectively, corresponding to a torque command T*. The motor controller measures d-axis and q-axis currents Id and Iq, respectively. An output torque is estimated as a sum of the torque command T* and a torque difference determined as a function of Id*, Iq*, Id, and Iq. An output signal may be generated indicative of the estimated output torque.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention comprehends various aspects of electric motor torque estimation. Examples are described in further detail below.

In one particular embodiment, the measurement of torque during motor calibration is relatively accurate; for each torque value, corresponding direct-axis (d-axis) and quadrature axis (q-axis) current commands are obtained to establish a look-up table for mapping each torque command to the corresponding direct-axis (d-axis) and quadrature axis (q-axis) current commands. During motor operation, a torque command T* is established based on vehicle operating conditions, and the d-axis and q-axis current commands Id* and Iq*, respectively, corresponding to the torque command T* are determined from the table. The motor is given current commands Id* and Iq*. The actual d-axis and q-axis currents, Id and Iq, respectively, are measured.

If Id and Iq feedbacks match commands Id* and Iq* very well, the torque should be very close to the torque command T*. Assuming calibration is 100% accurate, if there is zero error on Id and Iq compared to Id* and Iq*, there should be zero torque error compared to torque command T*.

By rewriting Id as Id*+Id_e and Iq as Iq*+Iq_e in which Id_e and Iq_e are the errors, torque estimation would be T=P/2×[phi×(Iq*+Iq_e)+(Ld−Lq)×(Id*+Id_e)×(Iq*+Iq_e)]. With the assumption of zero current error equates to zero torque error, torque command T*=P/2×[phi×Iq*+(Ld−Lq)× Id*×Iq*]. Decomposing torque estimation as P/2×[phi×Iq*+ (Ld−Lq)×Id*×Iq*]+P/2×[Phi×Iq_e+(Ld−Lq)×(Id_e×Iq*+ Iq_e×Id*+Id_e×Iq_e)], one can substitute the first portion with T* based on the previous assumption and only calculate the torque difference caused by Id and Iq differences. This approach may reduce the need to refine Ld and Lq estimation or calculation which is difficult and often not accurate.

Embodiments of the invention may be implemented in a variety of applications. One example is a hybrid electric vehicle powertrain.

Figure 1:
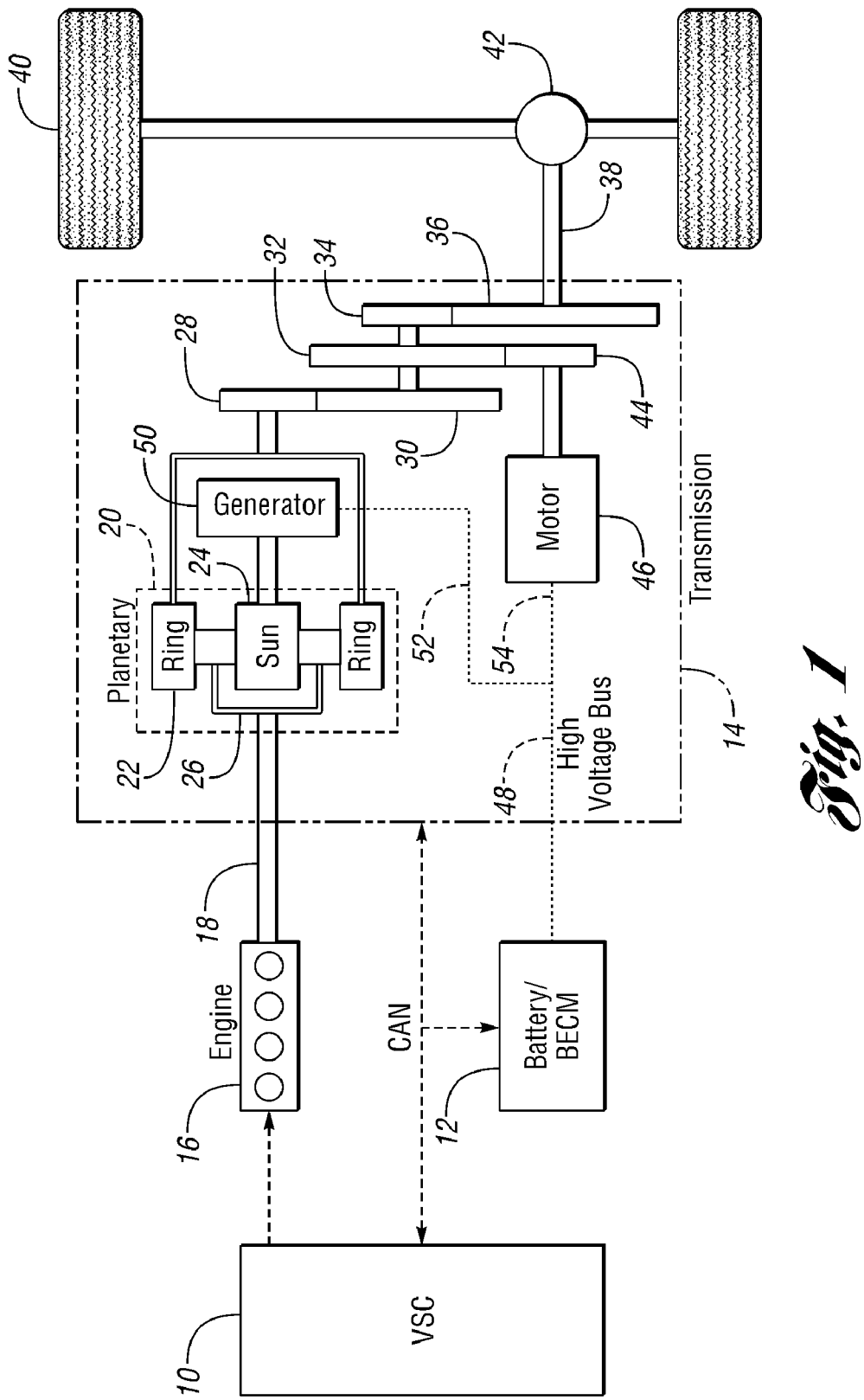
FIG. 1 is a schematic representation of a powersplit powertrain system configuration.

A hybrid electric vehicle powertrain is shown in FIG. 1. A vehicle system controller (VSC) 10, a battery and battery energy control module (BECM) 12, and a transmission 14, together with a motor-generator subsystem, comprise a control area network (CAN). An internal combustion engine 16, controlled by VSC 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission 14 is drivably connected to vehicle traction wheels 40 through a differential and axle mechanism 42.

Gears 30, 32, and 34 are mounted on a countershaft, with gear 32 engaging a motor-driven gear 44. Electric motor 46 drives gear 44, which acts as a torque input for the countershaft gearing.

The battery delivers electric power to the motor through power flow path 48, 54. Generator 50 is connected electrically to the battery and to the motor 46 in a known fashion as shown at 52.

The powersplit powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50, and the battery, where the battery acts as an energy storage medium for the generator 50 and the motor 46.

In general, VSC 10 calculates the total engine power needed to meet the drive wheel power demand plus all accessory loads, and independently schedules the engine speed and load operating point, with or without feedback of actual engine performance, to meet the total power demand. This type of approach is typically used to maximize fuel economy and may be used in other types of powertrain systems that have such VSCs.

Figure 2:
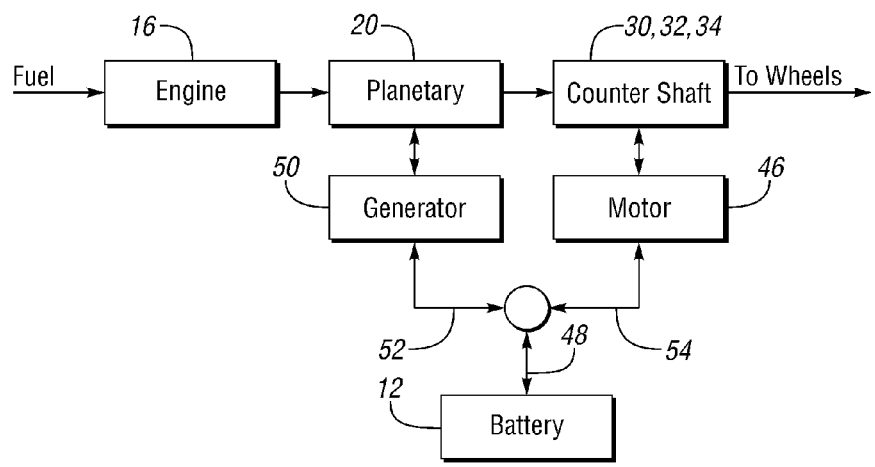
FIG. 2 is a schematic representation, in block diagram form, of a powertrain system power flow diagram.

The power flow paths between the various elements of the powersplit powertrain diagram shown in FIG. 1 are illustrated in FIG. 2. Fueling is scheduled based on driver and other inputs. Engine 16 delivers power to the planetary gear unit 20. The available engine brake power is reduced by accessory loads. Power is delivered by the planetary ring gear to the countershaft gears 30, 32, 34. Power output from the transmission drives the wheels.

Generator 50, when acting as a motor, can deliver power to the planetary gearing. When acting as a generator, generator 50 is driven by the planetary gearing. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimum split of power between the two power sources.

Figure 3:
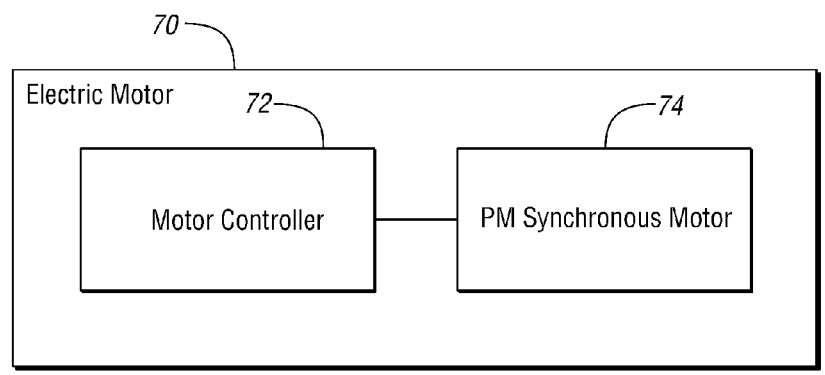
FIG. 3 illustrates an electric motor device, including a motor controller and a permanent magnet (PM) synchronous motor.

FIG. 3 illustrates an electric motor 70. Electric motor 70 includes motor controller 72 and permanent magnet (PM) synchronous motor 74. Electric motor 70 may be controlled in accordance with an embodiment of the invention. Embodiments of the invention are useful in hybrid and electric vehicles that use PM synchronous motors. For example, motor 46 or generator 50 (FIGS. 1 and 2) may be implemented as a PM synchronous motor, and electric motor 70 may represent motor 46 or generator 50. Embodiments of the invention are also useful in other applications, and electric motor 70 may represent some other electric motor.

In general, electric motor 70, in this example, operates by providing a torque command to the motor controller 72 which controls PM synchronous motor 74 and attempts to provide the commanded torque output. Motor controller 72 may receive other inputs such as, for example, available voltage and current motor speed, as appreciated by those skilled in the art. It is understood by those skilled in the art that it is difficult to calculate the output torque from electric motor 70. For certain applications, it is desirable to know this output torque. For example, in vehicle applications, the estimated electric motor torque could be compared against an expected range of values for diagnostic purposes.

Figure 4:
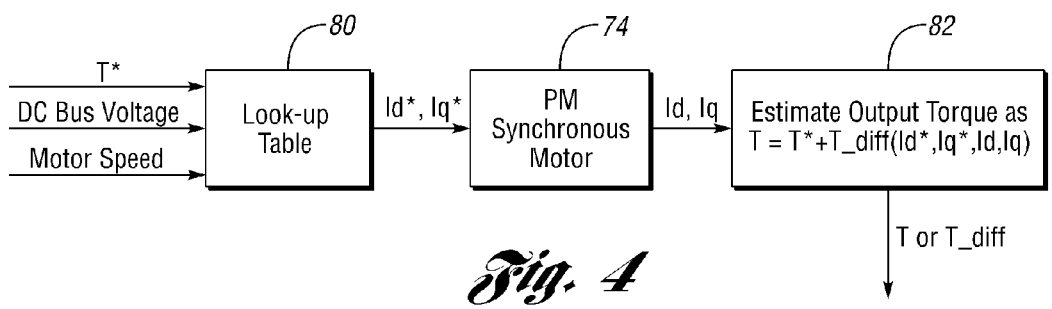
FIG. 4 illustrates a method of controlling a permanent magnet (PM) synchronous motor.

In more detail, FIG. 4 illustrates an example method of controlling PM synchronous motor 74. The electric motor is calibrated such that for each torque command, there are corresponding direct-axis (d-axis) and quadrature axis (q-axis) current commands, as depicted at look-up table 80. In this example, the look-up table 80 is used to determine d-axis current command Id* and q-axis current command Iq* based on torque command T* provided to the motor controller, and on DC bus voltage and motor speed. PM synchronous motor 74 is controlled based on Id* and Iq*. In turn, actual d-axis current Id and q-axis current Iq are measured, and output torque is estimated at block 82. More specifically, the output torque is estimated as a sum of the torque command T* and a torque difference. The torque difference is determined as a function of Id*, Iq*, Id, and Iq. The estimated output torque T (or the torque difference T*) is provided to an appropriate vehicle controller for use in controlling the vehicle, including, for example, diagnostic analysis.

Figures 5, 6:
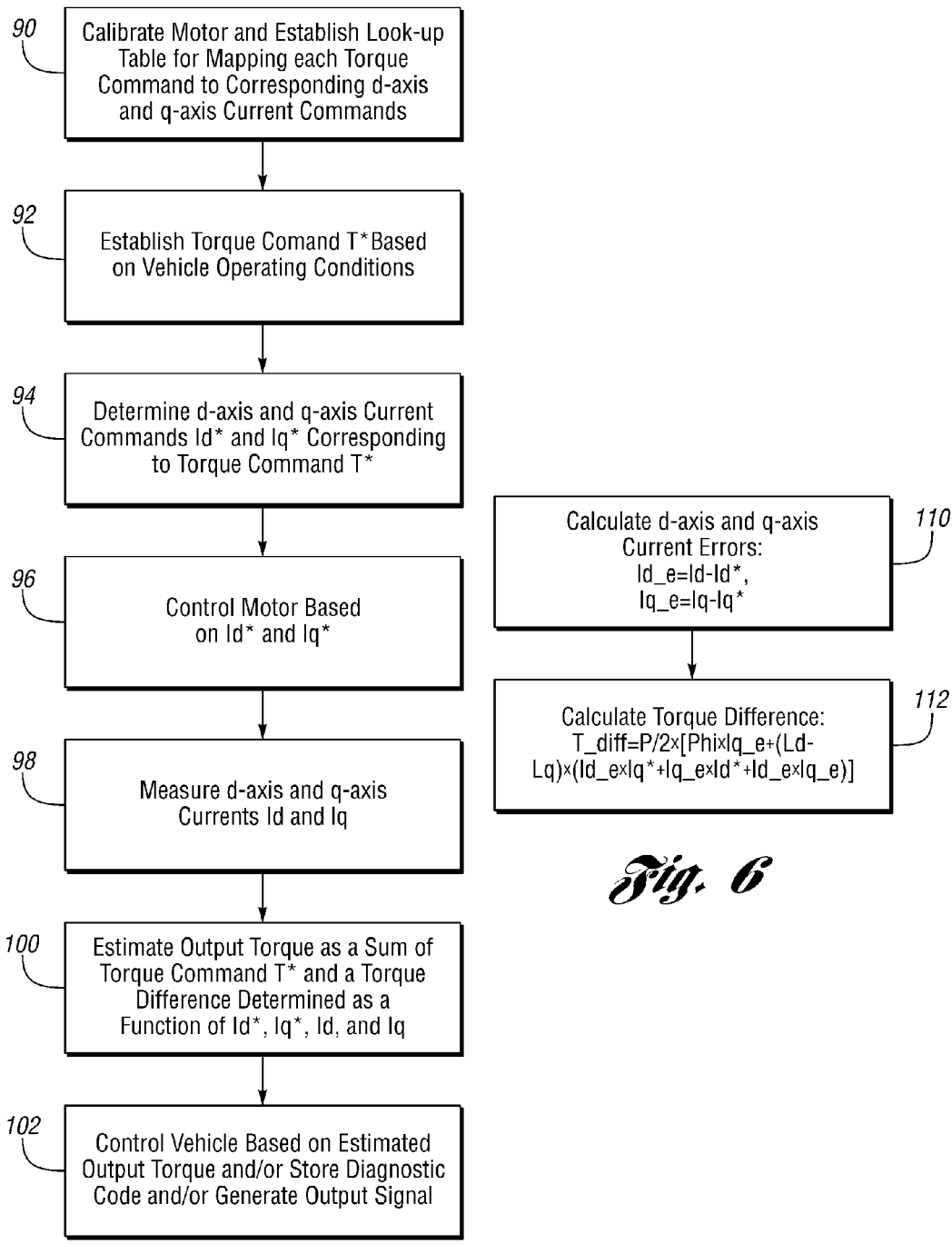
FIG. 5 illustrates a method of controlling a vehicle including a permanent magnet (PM) synchronous motor.
FIG. 6 illustrates further, more detailed aspects of estimating output torque.

FIG. 5 illustrates a method of controlling a vehicle including a permanent magnet (PM) synchronous motor. At block 90, the motor is calibrated and a look-up table is established for mapping each torque command to the corresponding direct-axis (d-axis) and quadrature axis (q-axis) current commands. Techniques for establishing such a look-up table are well known to those skilled in the art. At block 92, a torque command T* is established based on vehicle operating conditions. At block 94, d-axis and q-axis current commands Id* and Iq*, respectively, corresponding to the torque command T* are determined. At block 96, the motor is controlled based on Id* and Iq*. At block 98, d-axis and q-axis currents Id and Iq, respectively, are measured.

Output torque is estimated in accordance with an embodiment of the invention, at block 100. In more detail, output torque is estimated as a sum of the torque command T* and a torque difference. The torque difference is determined as a function of Id*, Iq*, Id, and Iq. As indicated at block 102, the estimated output torque may be used in various ways. For example, the vehicle may be controlled based on the estimated output torque, a diagnostic code may be stored in a memory, or an output signal indicative of the estimated output torque may be generated.

FIG. 6 illustrates further, more detailed aspects of estimating output torque. At block 110, d-axis and q-axis current errors Id_e and Iq_e, respectively, are calculated according to:

$$Id\_e = Id - Id^*; \text{ and}$$

$$Iq\_e = Iq - Iq^*.$$

At block 112, the torque difference is calculated according to:

$$T\_diff = P/2 \times [Phi \times Iq\_e + (Ld-Lq) \times (Id\_e \times Iq^* + Iq\_e \times Id^* + Id\_e \times Iq\_e)],$$

wherein T_diff is the torque difference, P is number of poles, phi is permanent magnet flux linkage, Ld is inductance at the d-axis, and Lq is inductance at the q-axis.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method of controlling a vehicle including a permanent magnet (PM) synchronous motor, the motor being calibrated such that for each torque command, there are corresponding direct-axis (d-axis) and quadrature axis (q-axis) current commands, the method comprising:
    establishing a torque command T*;
    determining d-axis and q-axis current commands Id* and Iq*, respectively, corresponding to the torque command T*;
    controlling the motor based on Id* and Iq*;
    measuring d-axis and q-axis currents Id and Iq, respectively;
    estimating an output torque as a sum of the torque command T* and a torque difference, the torque difference being determined as a function of Id*, Iq*, Id, and Iq; and
    controlling the vehicle based on the estimated output torque.

2. The method of claim 1 wherein the torque command T* is based on vehicle operating conditions.

3. The method of claim 1 wherein the vehicle includes a memory, and wherein controlling the vehicle comprises storing a diagnostic code in the memory.

4. The method of claim 1 further comprising:
    establishing a look-up table for mapping each torque command to the corresponding direct-axis (d-axis) and quadrature axis (q-axis) current commands.

5. The method of claim 1 further comprising:
    calculating d-axis and q-axis current errors Id_e and Iq_e, respectively;
    wherein Id_e=Id−Id*; and
    wherein Iq_e=Iq−Iq*.

6. The method of claim 5 wherein the torque difference is determined in accordance with:

$$T\_diff = P/2 \times [Phi \times Iq\_e + (Ld-Lq) \times (Id\_e \times Iq^* + Iq\_e \times Id^* + Id\_e \times Iq\_e)],$$

wherein T_diff is the torque difference, P is number of poles, phi is permanent magnet flux linkage, Ld is inductance at the d-axis, and Lq is inductance at the q-axis.

7. A method of controlling a permanent magnet (PM) synchronous motor, the motor being calibrated such that for each torque command, there are corresponding direct-axis (d-axis) and quadrature axis (q-axis) current commands, the method comprising:
    establishing a torque command T*;
    determining d-axis and q-axis current commands Id* and Iq*, respectively, corresponding to the torque command T*;
    controlling the motor based on Id* and Iq*;
    measuring d-axis and q-axis currents Id and Iq, respectively; and
    estimating an output torque as a sum of the torque command T* and a torque difference, the torque difference being determined as a function of Id*, Iq*, Id, and Iq.

8. The method of claim 7 further comprising:
    generating an output signal indicative of the estimated output torque.

9. The method of claim 7 further comprising:
    establishing a look-up table for mapping each torque command to the corresponding direct-axis (d-axis) and quadrature axis (q-axis) current commands.

10. The method of claim 7 further comprising:
    calculating d-axis and q-axis current errors Id_e and Iq_e, respectively;
    wherein Id_e=Id−Id*; and
    wherein Iq_e=Iq−Iq*.

11. The method of claim 10 wherein the torque difference is determined in accordance with:

$$T\_diff = P/2 \times [Phi \times Iq\_e + (Ld-Lq) \times (Id\_e \times Iq^* + Iq\_e \times Id^* + Id\_e \times Iq\_e)],$$

wherein T_diff is the torque difference, P is number of poles, phi is permanent magnet flux linkage, Ld is inductance at the d-axis, and Lq is inductance at the q-axis.

12. An apparatus for controlling a permanent magnet (PM) synchronous motor, the apparatus comprising:
    a motor controller configured to:

control the motor based on d-axis and q-axis current commands Id* and Iq*, respectively, corresponding to a torque command T*;

measure d-axis and q-axis currents Id and Iq, respectively; and estimate an output torque as a sum of the torque command T* and a torque difference determined as a function of Id*, Iq*, Id, and Iq.

13. The apparatus of claim 12 wherein the motor controller is further configured to:

generate an output signal indicative of the estimated output torque.

14. The apparatus of claim 12 wherein the motor controller is further configured to:

establish a look-up table for mapping each torque command to the corresponding direct-axis (d-axis) and quadrature axis (q-axis) current commands.

15. The apparatus of claim 12 wherein the motor controller is further configured to:

calculate d-axis and q-axis current errors Id_e and Iq_e, respectively;

wherein Id_e=Id−Id*; and wherein Iq_e=Iq−Iq*.

16. The apparatus of claim 15 wherein the torque difference is determined in accordance with:

$$T\_diff = P/2 \times [Phi \times Iq\_e + (Ld-Lq) \times (Id\_e \times Iq^* + Iq\_e \times Id^* + Id\_e \times Iq\_e)],$$

wherein T_diff is the torque difference, P is number of poles, phi is permanent magnet flux linkage, Ld is inductance at the d-axis, and Lq is inductance at the q-axis.

* * * * *